United States Patent [19]

Luijten

[11] Patent Number: 4,983,153
[45] Date of Patent: Jan. 8, 1991

[54] GEAR UNIT, PARTICULARLY FOR USE IN A HELICOPTER

[75] Inventor: Waltherus J. T. H. Luijten, Breugel, Netherlands

[73] Assignee: DAF Special Products, Geldrop, Netherlands

[21] Appl. No.: 294,403

[22] Filed: Jan. 9, 1989

Related U.S. Application Data

[63] Continuation of Ser. No. 941,146, Dec. 12, 1986, abandoned.

[30] Foreign Application Priority Data

Dec. 18, 1985 [NL] Netherlands ......................... 8503488

[51] Int. Cl.$^5$ ........................ F16H 1/32; F16H 57/02; B64C 27/12
[52] U.S. Cl. ..................................... 475/343; 74/416; 74/606 R; 416/170 R
[58] Field of Search ........................... 74/416, 606 R; 416/170 B; 475/331, 343, 348

[56] References Cited

U.S. PATENT DOCUMENTS

| | | | |
|---|---|---|---|
| 11,258 | 7/1854 | McCord | 74/801 |
| 267,440 | 11/1882 | Martin | 74/801 |
| 2,520,887 | 8/1950 | Miller, Jr. | 74/801 |
| 2,771,143 | 11/1956 | Campbell | 416/170 B |
| 2,911,851 | 11/1959 | Wachs | 416/170 B |
| 3,129,608 | 4/1964 | Watson | 416/170 B X |
| 3,188,884 | 6/1965 | Bancroft | 416/170 B |
| 3,486,832 | 12/1969 | Stone et al. | 416/170 B |
| 3,669,564 | 6/1972 | Garfinkle | 416/170 B X |
| 3,762,669 | 10/1973 | Curci | 416/170 B |
| 4,238,970 | 12/1980 | Carter | 74/457 |

FOREIGN PATENT DOCUMENTS

| | | |
|---|---|---|
| 1042388 | 10/1958 | Fed. Rep. of Germany . |
| 3144112 | 5/1983 | Fed. Rep. of Germany . |
| 2354922 | 1/1978 | France ..................... 416/170 B |
| 1000430 | 8/1965 | United Kingdom . |

OTHER PUBLICATIONS

Journal of the American Helicopter, vol. 29, No. 1, Jan. 1984, Herbert N. Shohet, "Propulsion Systems for Rotary Wing Aircraft with Auxiliary Propulsors", pp. 66-74.
Gear Handbook, Dudley, 1st Edition, McGraw-Hill Book Co., New York, Table 2-2.
Gear Handbook, Dudley, 1st Edition, McGraw-Hill Book Co., New York, pp. 2-9.

Primary Examiner—Allan D. Herrmann
Attorney, Agent, or Firm—Gipple & Hale

[57] ABSTRACT

In a high-loaded, light-weight, compact, multi-stage gear transmission unit with at least one stage with non-parallel shafts, and a transmission ratio between approximately 70 and 150, like a helicopter transmission, said angle transmission generally forms the weakest link. By adoption of a face gear/cylindrical pinion-stage instead of the commonly used bevelled-stage, not only a more reliable drive is possible, but its efficiency is higher, due to less friction, its size is smaller, its adjustment is simpler such that straight forward replacement becomes possible, and—not in the least—the transmission ratio of said angle drive tends to high ratios in contrast to known bevelled-drives which tend to low ratios. In many cases one or even more stages less become possible, providing a further important reduction in weight and size.

5 Claims, 3 Drawing Sheets

GEAR UNIT, PARTICULARLY FOR USE IN A HELICOPTER

This is a continuation of application Ser. No. 06/941,146 filed Dec. 12, 1986 now abandoned.

The invention relates to a gear unit having a plurality of reduction stages, particularly for use in a helicopter, and intended for a relatively high output torque with a relatively low speed of rotation and a total transmission ratio between about 70 and 150, with at least one stage with non-parallel shafts.

Gear units of the abovedescribed type, in which at least one stage has non-parallel shafts, for power transmission systems are usually gear units the construction of which already entails technical difficulties. When in addition they are used in aircraft such as helicopter the further problem arises of keeping their weight and size as low as possible, perhaps at the expense of long life, provided that reliable operation can be ensured during the possibly shortened life. If the output shaft of the gear unit is the shaft which carries and drives the main rotor of the helicopter, the problems to be overcome are even considerably greater, because all the forces, accelerations and moments which during flying operations, during maneuvres, starting and landing are exerted by the main rotor have to be transmitted to the body of the helicopter through the gear unit in question. At the same time the propulsion power must also be transmitted. The gearbox is therefore acted upon and loaded not only be the driving torque but also by the considerable external forces. A sufficiently strong light-weight gearbox can be built, but its rigidity will leave much to be desired, particularly in respect of the achievement of good running behavior of the gears contained in it. Gear units are thus often used in practice which by nature are self-correcting within certain limits, such as for example self-centring planetary gear units. However, every helicopter contains at least one transmission between non-parallel shafts, frequently at right angles with intersecting axes, although this is not necessarily the case. Only few non-parallel transmission types are known which reasonably well meet the requirements listed above, although in practice they frequently constitute the weakest link in the entire gear train. In most known transmissions, in which the power source is a gas turbine with a power output shaft with a speed of about 20,000 revolutions per minute or more, and in which the main rotor usually has a speed of about 200 revolutions per minute, the required reduction ratio is usually achieved by means of at least three or four stages. Only in the case of helicopters having a single gas turbine, such as small civil helicopters, it is possible to manage with a single transmission with non-parallel shafts in the transmission chain. Most helicopters have two gas turbines, which are frequently placed symmetrically on opposite sides of the vertical rotor shaft and themselves have an approximately horizontal axis and output shaft. Therefore, in this configuration, which is by far the one most used, two transmissions between non-parallel shafts are even required for the power flow of each gas turbine. In view of the great differences in the speeds between the input and output transmission shafts, a total transmission ratio between about 70 and 150 being necessary, the last reduction stages are for understandable reasons disposed directly under the wings because of their large diametral dimensions. The right-angle transmission is placed approximately in the middle of the transmission, for transmitting moderate torque and speed. For this most difficult stage, use is generally made of a bevel gear transmission. The following list broadly shows their most important characteristics:

Type 1: Bevel gears having straight or oblique teeth can be ground. Their loadability is lower, the required accuracy of adjustment is higher, and their sensitivity to elastic bending of the gears themselves and of the teeth alone is greater than in the case of type 2. The transmission ratio is limited to about 5.

Type 2: In the case of spiral-toothed bevel gears the loadability is greater, the accuracy of adjustment required is lower, although adjustment is still difficult, and sensitivity to elastic bending of the gears themselves and of the teeth alone is lower than in the case of type 1. The transmission ratio is limited to about 5. Considerable tooth flank friction occurs.

a. Gleason: can be ground. The obliquely of the tooth flanks $\beta_m$ may range from 0° to 45°.

b. Klingelnberg: cannot be ground $\beta_m$ always greater than 0, highly dependent on tooth width imposed by the system, true involute.

c. Oerlikon: cannot be ground, $\beta_m$ freely selectable, true involute.

Despite its simplicity, type 1 is generally out of the question for the prescribed requirements because of its low meshing-quotient. Types 2a, 2b, and 2c all have oblique and curved teeth. Because only the Gleason type can be ground, Gleason toothing is chosen for practically all applications. However, all transmission of type 2 have the property that the obliqueness of the tooth flanks is not constant over the width of the tooth, that is to say that $\beta$ declines over the width of the tooth. In operation this means that in addition to the constant axial force on the pinion and the gear, resulting from the bevel angle, a continuously varying additional axial force is thus produced in consequence of the variation of the angle $\beta$ during the engagement of each tooth over its width. This introduces axial vibrations which are already detrimental per se. In the case of serial connection of two transmissions of the types 2a, 2b, or 2c, resonance may therefore easily occur, with all its consequences. For the very light construction required for helicopters, this problem is obviously even more difficult to solve. The consequence is that for many transmissions the required reliability is difficult to achieve, particularly for light-weight constructions. Furthermore, particularly complicated constructions and extremely difficult alignment problems arise, while the replacement of the bevel wheels is in many cases not possible in a straight-forward way. Only heavier types of transmissions appear to be fully adequate. All in all, the gear units in question are among the most difficult in the art and still require considerable improvement.

The invention now seeks to improve the gear unit described above, on the one hand by making it more reliable with better alignment conditions and on the other hand giving it smaller dimensions. In many cases this last feature will in addition be combined with lower weight.

According to the invention this aim is now achieved in that the stage with the non-parallel shafts is formed by a face gear which is disposed concentrically to the output shaft and cooperates with a cylindrical (spur) gear and which transmits power to said output shaft. Face gear transmissions are, of course, well known in the art and a face gear transmission of the type used in this invention is known from earlier EP-A-227152 published on 1-7-87. One of the advantageous properties of a face gear transmission this kind consists in that it is particularly suitable for high transmission ratios, in particular from about 5 upwards, in contrast to known bevel gear transmissions which can have at most a transmission ratio of 5, and frequently even lower for higher loads. Another great advantage of the face gear transmission consists of the fact that no axial forces at all are applied to the shaft of a cylindrical spur gear and that the latter is even displaceable in the axial direction without detrimentally affecting the kinematics of the transmission. The depth of engagement of the teeth of the cylindrical (spur) gear into those of the face gear is considerably less critical than is the case in all bevel gear transmissions, so that a number of the known alignment problems in bevel gear transmissions do not occur or occur only to a lesser degree. Compared with the Gleason toothing mostly employed, tooth flank friction is substantially reduced, so that an improvement of efficiency of about 1 to 2% is possible in each face gear stage, partly owing to the fact that bearing loading is also lower. The cylindrical (spur) gear in hardened form can easily be machined with known machine tools with the greatest accuracy, and this permits high peripheral speeds because only slight additional dynamic loads are generated. The reproducibility of these gears is optimum, so that, in conjunction with the less critical alignment, straightforward interchangeability, including or excluding the appertaining journalling, is possible. A modular construction of the gear transmission in question is now possible, in contrast to known gear transmissions.

As the result of the abovedescribed properties, it is surprisingly possible to overcome the most important problems occurring with known gearboxes by using one or more face gear transmissions. Because of the preferably high transmission ratio of the face gear transmission, it is possible in many cases to achieve the total transmission ratio required with one or even two stages fewer. The most important advantage is however obtained if the face gear transmission is used as the last or last but one stage of the entire gear unit, so that the face gear is thus installed concentrically in relation to the output shaft. It is thereby possible for the vertical dimensions of the gearbox to be drastically reduced in comparison with those of known gearboxes. If, as is frequently the case, a planetary transmission is used as the last stage, then in a preferred embodiment the face gear can be constructed in the form of a ring gear, in which case the last planetary stage can be substantially disposed inside the ring. A further reduction of vertical dimensions of the gearbox is thus possible.

Partly because of the previously described possibility of modular construction, the main gearbox carrying the output shaft may be substantially cylindrical in shape and therefore rotationally rigid, which is of course advantageous in connection with the above-described very differently directed and sometimes very great forces acting on it.

Finally, it may be important for many applications that the face gear transmission with the high transmission ratio should be the last or last but one stage. It is then possible to keep the preceding stages at higher speeds, so that torques and forces in those stages will be smaller. If the conditions for installation in a helicopter make it possible for face gear according to the invention to be used concentrically to the output shaft as the last or last but one stage with a large diameter, a transmission ratio of 1:10 or more can be used with increasing advantage, without limitation, which is of course advantageous in respect of the total transmission ratio required, because this simplifies the other stages. In certain circumstances the required transmission ratio of 1:70 to 1:150 can therefore be obtained with two face gears, although in that case the face gear in the first stage must have a relatively large diameter.

Another advantage due to the invention may be pointed out, namely the fact that it is made easier to use a hollow output shaft having a relatively large outside diameter, without the gearboxy having for that reason to be disproportionally large. This is advantageous when a rotor system is used, in which case the adjusting mechanism for the angle of incidence for the wings or blades is passed through the hollow shaft from an operating unit disposed under the gear unit. It is obvious that the overall dimensions of the gear unit, even of the unit according to the invention, can be smaller if a rotor is used which has an externally disposed operating rod system for pitch angle adjustment. The output shaft can then have smaller outside dimensions.

It is obvious that the gear unit according to the invention can be provided in known manner with the necessary drives for all auxiliary equipment required.

Some preferred embodiments according to the invention will now be explained in greater detail as examples, with the aid of the following description of the drawings.

Figure 1:
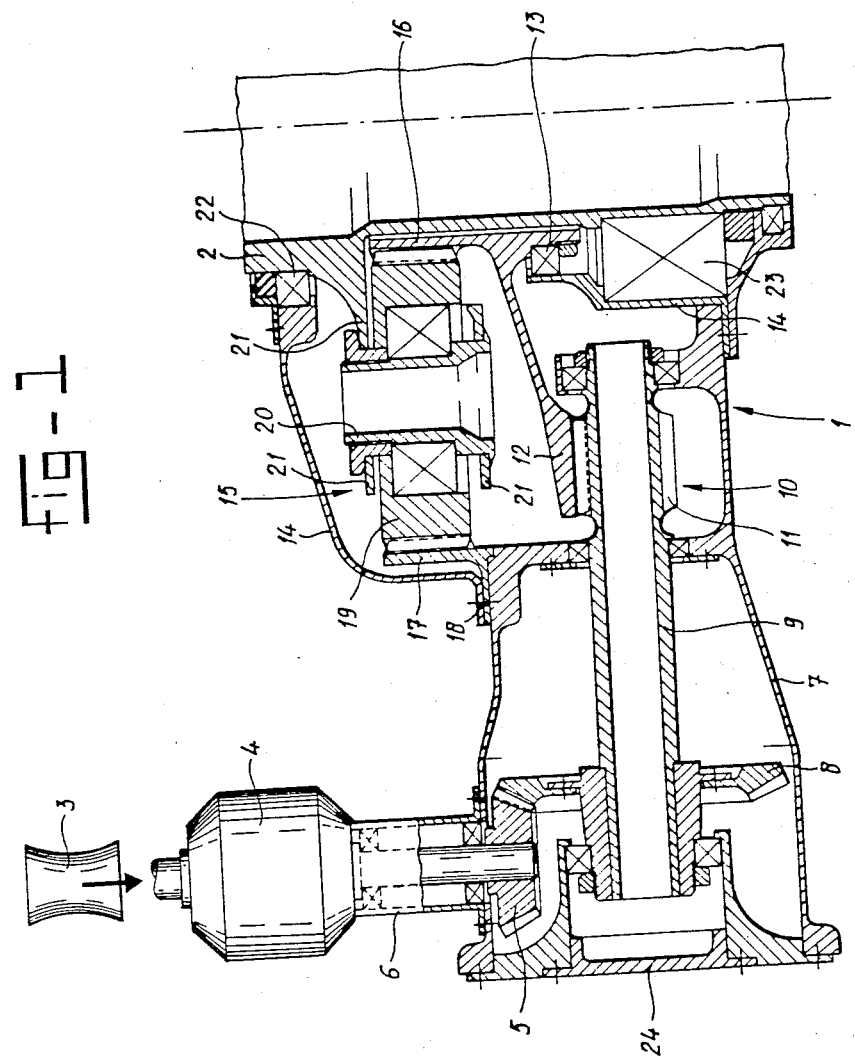
FIG. 1 is a diagrammatical section through a gear unit according to the invention.

FIG. 1 shows diagrammatically a main box gear according to the invention for a helicopter, comprising four stage (reduction units) of which the third, referring to the direction of the power flow, is a face gear transmission. The main gear box is designated 1. It is substantially in the form of a flat cylindrical drum in the axis of which a hollow output shaft 2 is mounted. At the top end of the shaft 2 is disposed a lifting and propulsion rotor (not shown) of the helicopter. Actuating means (not shown) for adjustment of the pitch angle of the rotor blades during operation can be passed through the hollow shaft 2. The main gear box 1 is of a type suitable to be driven by two gas turbines 3. Only one of these is shown in the drawing, and it will be clear that the other can be correspondingly disposed in the same plane or in a different plane. It will also be clear that during operation the output shaft 2 is directed substantially vertically and that the gas turbines 3 generally used have a horizontal axis. This means that the gas turbine 3 and the first-stage transmission 4, as well as a bevel wheel of the second-stage transmission 5, are turned 90° in the drawing. The first-stage transmission is shown diagrammatically as a planetary transmission, but a transmission with offset parallel axes may equally well be used. In FIG. 1 the first-stage transmission 4 is fastened in a fixed position on a secondary gearbox 7 with the aid of a pedestal 6 shown diagrammatically. The gearbox 7 of the second-stage transmission is shown in FIG. 1 as an integral component of the main gearbox 1. It will be clear that it could nevertheless also be constructed in the form of a separate attachable gearbox (not shown). In view of the fact that the type of gear box referred to is generally particularly complicated, all known constructional details not essential to the invention have been omitted. Thus, for example, most of the shafts have been shown as rigid shafts, whereas in reality they may be torsionally elastic and be provided with axial and radial aligning couplings. In addition, in many cases the pedestal 6 between the first stage reduction unit and the second stage need not be of rigid construction, but may be flexible or be dispensed with completely. The shafts must in fact have the necessary flexibility in all cases. However, for the sake of simplification all these known complicated details have been omitted. The bevel gear 5 shown in the second stage cooperates with bevel gear 8 which is fastened on and carried by shaft 9, which forms the connection between the second reduction stage and the third reduction stage, which is given the general reference numeral 10. The third reduction stage 10 forms the right angle transmission according to the invention and consists of a cylindrical (spur) gear or pinion 11 and a face gear 12. The latter is mounted by means of ball bearing 13 on a bush 14 fastened on the main gearbox 1. The third reduction stage 10 has, in FIG. 1, a transmission ratio of about 1:9. The power flow passes on to the fourth reduction stage, which is given the general reference numeral 15 and is disposed in the main gearbox 1 under a cover 14. This fourth stage is formed by a sun wheel 16 integral with the face gear 12. The outer side of the fourth stage 15 is formed by a ring gear 17, which is fastened by means of a flange 18 to the top edge of the gearbox 1. The sun wheel 16 and the ring gear 17 are both disposed concentrically to the axis of the output shaft 2. Between the sun wheel 16 and the ring gear 17 a plurality of planet gears 19, distributed over the periphery, are disposed in known manner, their teeth meshing with the sun wheel and the ring gear. Each planet gear is mounted for rotation, in known manner (not shown in detail), on a shaft 20, enclosed in a known planet carrier 21. According to FIG. 1 the planet carrier 21 is an integral component of the output shaft 2. It will be clear that the planet carrier 21 is provided in known manner with a number or recesses and bores equal to the number of planet gears 19 and planet gear shafts 20. The power flow from the gas turbine 3 passes via the sun wheel 16, the planet gears 19, and the shafts 20 to the planet carrier 21, and thus to the output shaft 2. The reaction forces are taken by the ring gear 17. With a planetary transmission 15 arranged in this manner the transmission ratio is, depending on the ratio between the diameter of the sun wheel 16 and the plane gears 19, between about 1:2 and 1:4. From the drawing it can be seen that by means of bearings 22 and 23 the output shaft 2 firmly mounted, both axially and radially, in the main gearbox 1.

Removal of a cover 24, disposed in the axis of the connecting shaft 9, of the second-stage gearbox 7, makes it possible for the shaft 9 together with the cylindrical (spur) gear 11 of the third-stage face gear transmission 10 to be easily removed towards the left in the drawing. Because of the properties of the face gear transmission 10, after overhaul or replacement, the same or a substitute gear 11 can be refitted without difficulty, and in particular without expensive, critical alignment operations being necessary.

To illustrate the abovedescribed gear unit, use may may be made of an example in which the gas turbine 3 has a power of several thousand kW and the power output shaft has a speed of 20,000 to 30,000 revolutions per minute. The output shaft 2 has to provide a rotor speed of about 200 revolutions per minute, so that the total transmission ratio required is between 1:100 and 1:150. The planetary fourth stage 15 shown has a reduction ratio of about 1:3 and the third face gear stage 10 has a reduction ratio of 1:9, so that these stages together have a ratio of about 1:27. For the first and second stages together there thus remains a required reduction ratio of 1:4 to 1:6. It will be clear that a reduction ratio of this kind can be achieved with known means, in which the reduction ratio of the second stage shown, comprising bevel gears 5 and 8, must be low for considerations of mass, volume, efficiency, life, and reliability, so that the greatest reduction must be made in the first stage 4. The gearbox according to FIG. 1 is a decidedly flat drum in comparison with the majority of known gear units of this kind for use in helicopters, these units frequently being considerably larger in the vertical direction. This is made possible in particular by the third stage 10, with its reduction ratio of 1:9.

Figure 2:
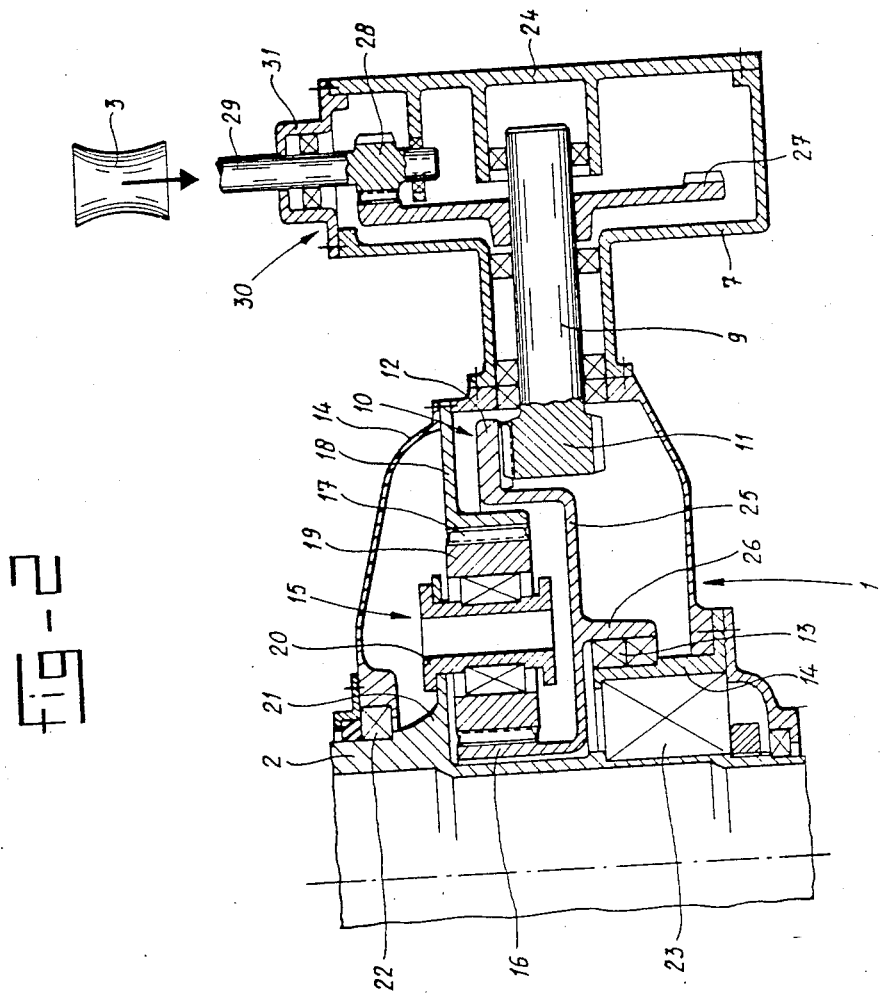
FIG. 2 shows an alternative embodiment of a gear unit according to the invention, which comprises a main gearbox of corresponding diameter to that shown in FIG. 1 and is provided with alternative preceding reduction stages.

FIG. 2 shows an alternative gear unit according to the invention. Corresponding parts are given the same reference numerals as in FIG. 1, but may be differently located or have different dimensions. In order to permit comparison with FIG. 1, a gearbox is shown which is intended for the same specification, for the same transmitted power, and the same reduction ratio, and which is built around the same hollow shaft 2. It is at once clear that the main gearbox 1 has again become flatter in the vertical direction. This is made possible by the fact that the face gear 12 of the reduction stage 10 is in the form of a ring 25, which again carries the sun wheel 16 and by means of a hub 26 is mounted, similarly to the arrangement shown in FIG. 1, by means of bearings 13 on a hub 14 fastened to the gearbox. In the embodiment shown in FIG. 2 the cylindrical (spur) gear cooperating with the face gear 12 is overhung on the connecting shaft 9. The last planetary stage 15 is similar in construction to that shown in FIG. 1, but the ring gear 17 has a smaller diameter and is fastened by a longer flange 18 to the top edge of the gearbox. The planet gears 19, and their shafts 20 are thus of lighter construction, so that a few more planets will be required than in the embodiment shown in FIG. 1. It is known that the number of planets may vary between 3 and about 9. The transmission ratio of the planetary stage 15 is once again about 1:3, while that of the face gear transmission 10 is about 1:10. Although this is not shown in the drawing, it will be clear that the same first and second stages as described above and illustrated in FIG. 1 may also be used in the case of FIG. 2. On the other hand, FIG. 2 shows an alternative embodiment in which the first and second stages shown in FIG. 1 are combined to form a single stage consisting once again of a face gear transmission comprising a face gear 27 and a cylindrical (spur) gear 28. The latter is mounted on an input shaft 29, and is driven via the latter by the gas turbine 3. The combined first stage is designated 30. It is indicated diagrammatically by means of covers 24 and 31, that once again, because of the properties of the face gear transmissions, the gears 28 and 11 can in a simple and immediately reproducible manner be inspected, refitted or replaced. No difficult problems of alignment arise in doing this. The first-stage reduction gear unit 30 shown in FIG. 2 is once again in the form of a flat drum. If the design of the helicopter makes it possible, this is a particularly attractive embodiment because the first-stage face gear reduction gear unit 30 can without any problems achieve a reduction ratio of 1:10 or even 1:15. Only the increasing dimensions would give rise to difficulties. It is however an advantage that such a high reduction ratio, in conjunction with the other face gear reduction gear unit 10, can produce the total reduction ratio required for the entire gear unit, so that, if desired, the last planetary stage 15 could be omitted. In that case the main gearbox 1 is again made flatter and smaller in the vertical direction. The necessary bearing length for the output shaft 2 in the bearings 22 and 23 need not then be made too short, because under and/or above the very flat main gearbox 1 it is possible for hubs to project to hold and support the bearings 22 and 23. These hubs obviously have a considerably smaller outside diameter than the actual gearbox 1.

It will be clear that the integrated first stage 30 shown in FIG. 2 could also be used in the embodiment shown in FIG. 1.

It is surprisingly that through the use of one or more face gear transmissions a gear unit of the kind described can be given substantially smaller dimensions and lower weight, and that nevertheless manufacturing requirements are in some respects less critical, that some of the problems of alignment and deformation of the gear unit during operation are less critical, and that problemless exchangeability has become possible, at least for the face gear transmission units. This last point is very important in aviation, because in consequence of the necessary weight restrictions it is the general practice to load many components so heavily that regular inspection and/or replacement are necessary.

Figure 3:
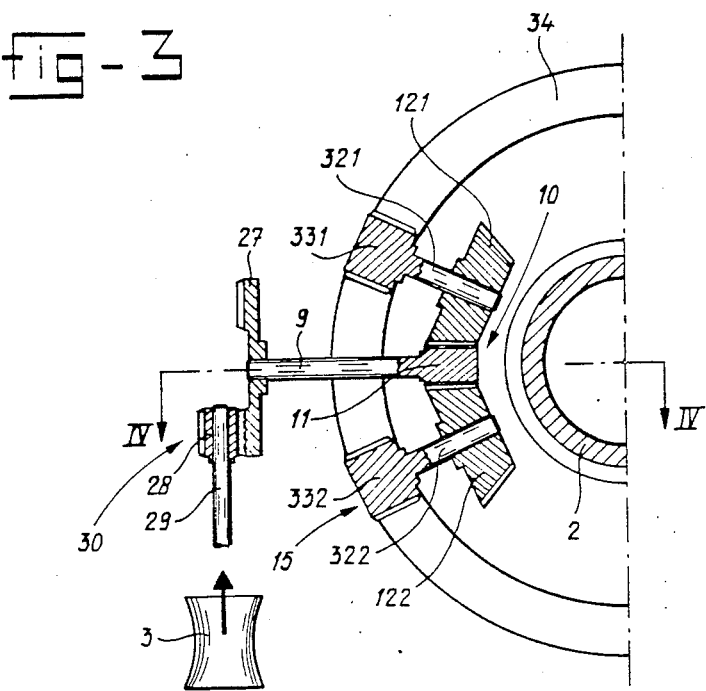
FIGS. 3 and 4 are two diagrammatical elevations of an alternative transmission having three face gear stages and power division.
Figure 4:
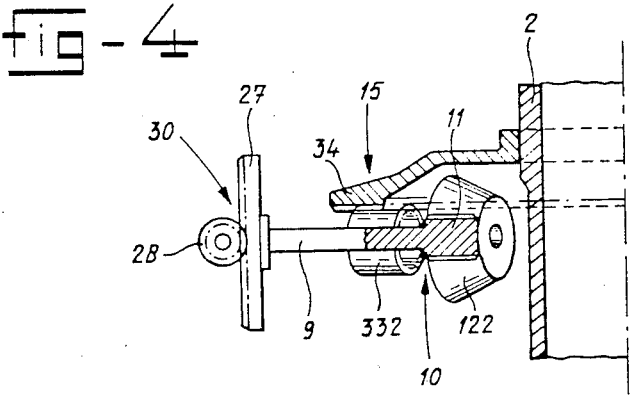

The advantages indicated above are even more apparent in another preferred embodiment of the kind illustrated in FIGS. 3 and 4. This embodiment relates to a transmission according to the invention consisting solely of three face gear stages, combined with power division. These figures show only one half of a transmission unit, but it will be clear that the other half can be similarly provided with a corresponding mirror image transmission. Once again 2 designates the vertical rotor output shaft of the helicopter and 3 a propulsion power turbine. The first-stage transmission 30 receives power via shaft 29 carrying the cylindrical (spur) gear 28 which meshes with the face gear 27. From the face gear 27 shaft 9 drives the cylindrical (spur) gear 11 of the second stage 10. The gear 10 meshes with respective face gears 121 and 122 which are disposed on opposite sides of it and which in this case are in the form of conical face gears. One half of the input power then passes through shaft 321 to cylindrical (spur) gear 331 of the third stage 15. This gear meshes with the face gear 34, axis of which coincides with the axis of the output shaft 2. As shown in FIG. 4, it may be connected directly to the output shaft 2. The other half of the power flow passes via shaft 322 and cylindrical (spur) gear 332 likewise to the third-stage face gear 34. In the embodiment illustrated, the first stage 30 has a transmission ratio of 3.5, the second stage 10 has a ratio of 3, and the third stage 15 a ratio of 10, so that the total transmission ratio amounts to 1:105. The stage which is usually the most difficult to achieve is the middle stage, that is to say in this example the second stage 10. This stage is provided in an extremely simple manner with power division, but it will be clear that in certain circumstances it will also be possible to dispense with power division, while nevertheless still retaining substantially the same construction of the transmission unit as a whole. It is also an advantage that when the drive consists of two gas turbines and the right-hand half of the transmission unit, which is not shown in the drawing, is a mirror image embodiment, the two gas turbines turn in the same direction of rotation and therefore are interchangeable. FIGS. 3 and 4 show only a diagram of the embodiment, so that all bearings and the like and the entire gearbox are omitted. However, comparison with the embodiment shown in FIGS. 1 and 3 shows that with the same dimensions of the third-stage face gear 34 according to FIGS. 3 and 4 as in the case of the face gear 12 shown in FIGS. 1 and 2, the first stage 30 according to FIGS. 3 and 4 can have substantially smaller dimensions than the transmissions according to FIGS. 1 and 2 which lie outside the actual gearbox 1. Practical installation conditions for the embodiment shown in FIGS. 3 and 4 will therefore be more advantageous than for that shown in FIGS. 1 and 2.

I claim:

1. A gear unit having a plurality of reduction stages, for use in a helicopter, and intended for a relatively high output torque at an output shaft which carries and drives the main rotors of the helicopter with a relatively low speed of rotation and a total transmission ratio between about 70 and 150, comprising at least one reduction stage with non-parallel shafts, and including a face gear transmission used on the last or next to last reduction stage of the gear unit, said stage with non-parallel shafts comprising a rotor shaft, a gear box mounted around said rotor shaft, a face gear disposed in said gear unit positioned concentrically to said output shaft and cooperating with a cylindrical spur gear on said rotor shaft which transmits power to the output shaft, said cylindrical spur gear being removable from said gear unit through detachable cover means mounted to said gear box and/or by detaching said gear box procedures previously required to replace the cylindrical spur gear.

2. Gear unit according to claim 1, wherein a planetary transmission assembly comprising a sun gear, a ring gear, and a plurality of planets is provided in the power flow between the face gear and the output shaft, the face gear being constructed in the form of a ring gear with the planetary assembly planets and sun gear being disposed substantially within the ring gear.

3. Gear unit according to claim 1 wherein said gear unit housing has a substantially flattened cylindrical shape with a flat drum and said spur gear—face gear is a second stage of said plurality of reduction stages and a preceding reduction stage is also in the form of a face gear transmission with a cylindrical spur gear.

4. Gear unit according to claim 1, characterized in that there is a total of three reduction stages of the type comprising a face gear and a cylindrical (spur) gear, the first and third stages being a substantially right angled transmission and the middle stage being a gear transmission with an angle between the shafts in the range between about 10° and 45°, said middle stage transmitting the power to the third stage with or without power division.

5. A gear unit in combination with a helicopter having a plurality of transmission reduction stages, for use in said helicopter, and intended for a relatively high output torque at an output shaft which carries and drives the main rotor of the helicopter with a relatively low speed of rotation and a total transmission ratio between about 70 and 150, comprising a transmission reduction stage with non-parallel shafts after the initial transmission reduction stage, said transmission reduction stage with non-parallel shafts comprising a cylindrical pinion gear positioned on a shaft for transmission of power to a face gear positioned adjacent to said output shaft and cooperating with said cylindrical pinion gear, said shaft and pinion gear being encased by a gearbox with removable cover means, said cover means when removed allowing the shaft and associated cylindrical pinion gear to be removed from the transmission for repair or replacement.

* * * * *